(12) United States Patent
Boyes

(10) Patent No.: US 6,360,482 B1
(45) Date of Patent: Mar. 26, 2002

(54) SPRAY BOOTH FOR REPRODUCIBLE APPLICATION OF AGRICHEMICALS

(75) Inventor: Douglas C. Boyes, Chapel Hill, NC (US)

(73) Assignee: Paradigm Genetics, Inc., Research Triangle Park, NC (US)

( * ) Notice: Subject to any disclaimer, the term of this patent is extended or adjusted under 35 U.S.C. 154(b) by 0 days.

(21) Appl. No.: 09/371,105

(22) Filed: Aug. 10, 1999

(51) Int. Cl.[7] ............................................. A01G 31/00
(52) U.S. Cl. ....................................................... 47/62 A
(58) Field of Search ........................... 47/1.7, 17, 58.1, 47/60, 65; 118/70; 119/420; 422/170; 451/89; 454/52, 56, 59

(56) References Cited

U.S. PATENT DOCUMENTS

| | | |
|---|---|---|
| 762,014 A | 6/1904 | Wittbold |
| 2,576,008 A * | 11/1951 | Gladfelter ..................... 451/89 |
| 2,855,725 A | 10/1958 | Carothers |
| 2,928,211 A | 3/1960 | Martin |
| 3,295,763 A | 1/1967 | Brauner |
| 3,824,736 A * | 7/1974 | Davis ............................ 47/17 |
| 3,941,040 A * | 3/1976 | Carlson ........................ 454/56 |
| 3,943,658 A | 3/1976 | Hai |
| 4,074,856 A | 2/1978 | Williams et al. |
| 4,216,741 A * | 8/1980 | Moss ......................... 119/420 |
| 4,292,762 A | 10/1981 | Fogg et al. |
| 4,316,347 A * | 2/1982 | Smith ............................ 47/17 |
| 4,543,744 A | 10/1985 | Royster |
| 4,567,732 A | 2/1986 | Landstrom et al. |
| 4,605,000 A | 8/1986 | Anguita |
| 4,723,714 A | 2/1988 | Lucas |
| 4,842,204 A | 6/1989 | Debruhl |
| 4,928,425 A | 5/1990 | Walter et al. |
| 4,928,889 A | 5/1990 | Lucas |
| 4,965,962 A | 10/1990 | Akagi |
| 5,152,099 A * | 10/1992 | Nilssen .......................... 47/65 |
| 5,212,903 A * | 5/1993 | Talbott ........................... 47/17 |
| 5,283,974 A | 2/1994 | Graf |
| 5,299,383 A | 4/1994 | Takakura et al. |
| 5,315,834 A | 5/1994 | Garunts et al. |
| 5,344,084 A | 9/1994 | Andrews et al. |
| 5,344,615 A * | 9/1994 | Yanagi ........................ 422/170 |
| 5,855,509 A * | 1/1999 | White .......................... 454/52 |
| 5,882,404 A * | 3/1999 | Gummer ....................... 118/70 |
| 6,055,771 A * | 5/2000 | Warnacut ..................... 47/58.1 |

OTHER PUBLICATIONS

Halltech Environmental Inc., Spray Booth, pp. 8–9.

\* cited by examiner

*Primary Examiner*—Michael J. Carone
*Assistant Examiner*—Francis T. Palo
(74) *Attorney, Agent, or Firm*—Joseph T. Majka; Henry P. Nowak

(57) ABSTRACT

A spray booth is provided for reproducible application of agrichemicals to plants. The spray booth comprises a support member for supporting a plurality of plants, a cover having a plurality of sides and a top and forming an enclosure with the support member for enclosing the plants therein, an agrichemical source for providing a pressurized agrichemical, and a spray arm having a spray mechanism operably connected to the agrichemical source. Preferably, the spray arm is disposed within the enclosure and over the support member such that it extends across the width of the support member. The spray mechanism is used for spraying a predetermined amount of the agrichemical therefrom in the form of a fine mist along the length of the spray arm. Advantageously, at least one of the support member and the spray arm is laterally moveable relative to the other such that the plants disposed both lengthwise and widthwise on the support member are substantially uniformly misted with the agrichemical. In one embodiment of the present invention, the support member supporting the plants is stationary while the spray arm is adapted to move bidirectionally in a substantially horizontal plane thereabove. In an alternate embodiment, the spray arm is stationary and the support member supporting the plants is adapted to move bidirectionally in a substantially horizontal plane therebelow.

18 Claims, 4 Drawing Sheets

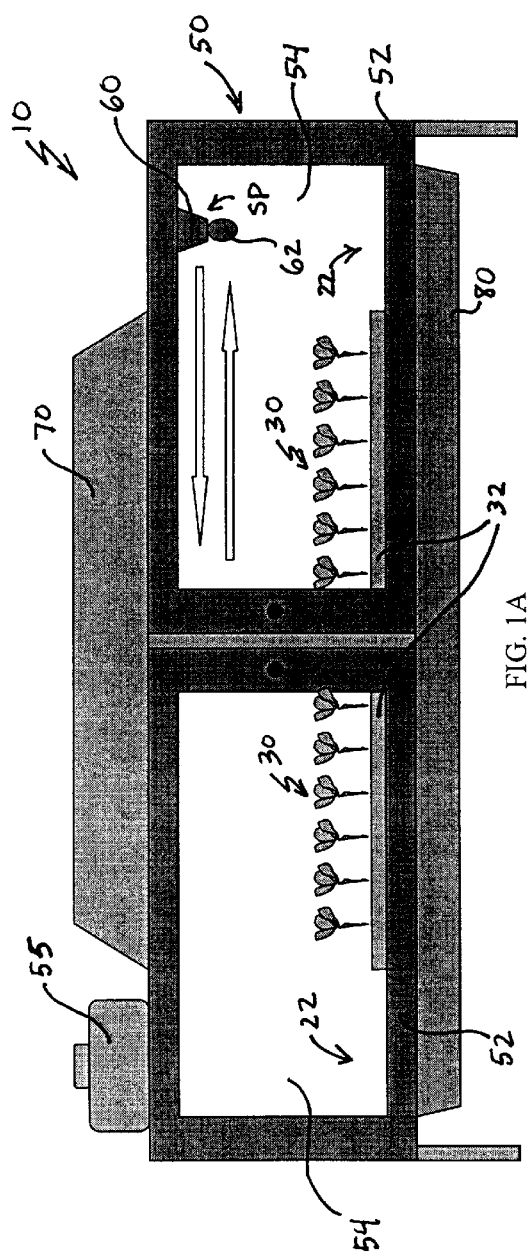
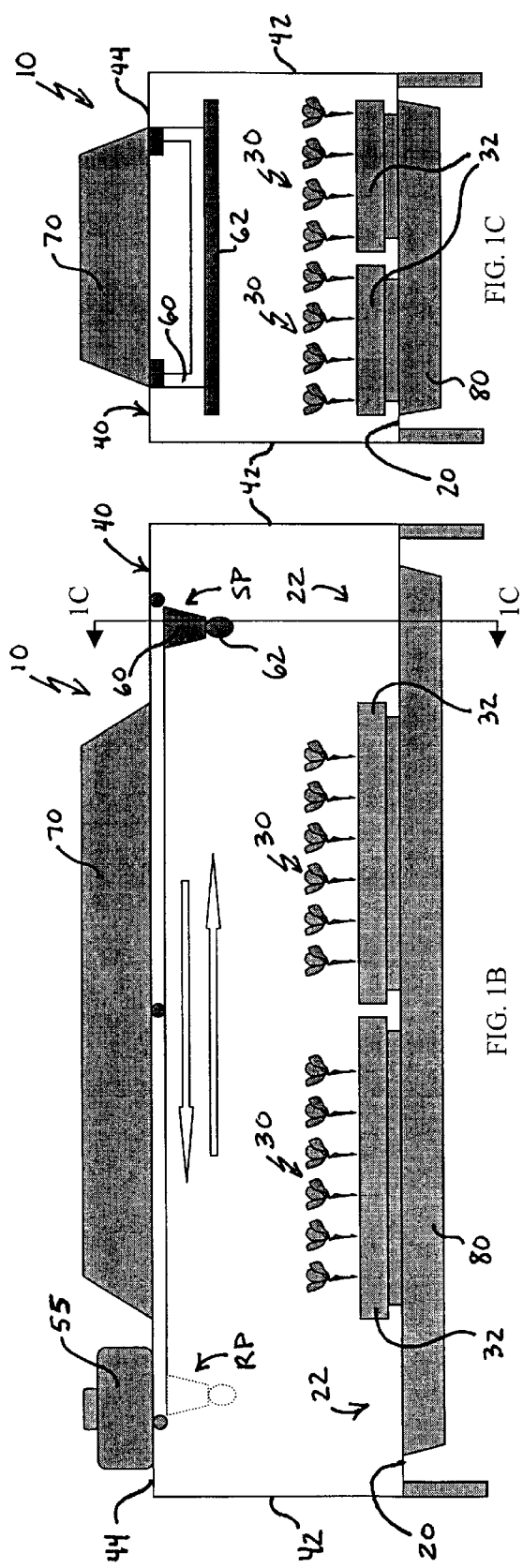

SPRAY BOOTH FOR REPRODUCIBLE APPLICATION OF AGRICHEMICALS

FIELD OF THE INVENTION

The present invention relates to spray booths for agricultural applications and, more particularly, to a spray booth for reproducible application of agrichemicals to plants.

BACKGROUND OF THE INVENTION

Plant genomics is a highly complex science in which researchers determine the genetic makeup of a plant and correlate the genetic information with particular characteristics of the plant. To this end, it is desirable to minimize as many variances in the experimental parameters as possible in order to obtain more accurate genetic data on the plants.

Typical plant genomics research involves exploration of the interaction between the plant and various herbicides or pesticides which may be used on or around the plants in the field. Laboratory methods for investigating the effects of herbicides and pesticides on plants generally requires application of herbicides or pesticides, commonly referred to as agrichemicals, to numerous batches of samples of the plants to be used to conduct the genomics research. Accordingly, it is highly desirable for all samples in the individual batches to be treated with the agrichemical in as uniform and consistent a manner as possible. Currently, the agrichemical application process in the laboratory setting typically is performed using a handheld sprayer to manually apply the agrichemical to each batch of plant samples. However, manual application of the agrichemical tends to introduce large variances in the plant samples due to inconsistent coverage of the plants with the agrichemical and variable agrichemical application rates. For example, certain plants may have little or no coverage with the agrichemical while other plants may be doused. Further, it is often required that the agrichemical be applied as a substantially uniform surface coating on the plants. Consistent, uniform coverage and application rates produce more desirable test samples with little or no variance therebetween. In addition, in order to further reduce variances, the agrichemical should be applied with minimal physical impact upon the plants. Still further, plants at various stages of growth or plants of different heights may be treated with noxious agrichemicals, wherein the agrichemical must be cleaned up after application. Thus, a suitable agrichemical application system should be adaptable to these needs.

In light of the above requirements, there exist certain systems which are not particularly suited for the described purpose. For example, certain patents, such as U.S. Pat. No. 5,283,974 to Graf, Jr. and U.S. Pat. No. 3,943,658 to Hai, describe environmentally controlled chambers for plants. These patents generally describe watering systems within the chamber comprising a number of stationary nozzles for irrigating the plants therein. Stationary nozzles, however, will tend to provide an uneven and non-uniform coverage of the plants being sprayed.

In further detail, the Graf, Jr. '974 patent discloses an environmentally controlled cabinet with a system for watering the plants contained therein through a plurality of misting heads located adjacent to the back panel of the central housing. However, because the misting heads are located in fixed positions adjacent to the back panel and thus are not evenly dispersed about the housing, the mist supplied by the stationary heads will have a defined water dispersion pattern which may not produce even and uniform wetting of the plants contained within the chamber for a given amount of water being sprayed. Further, in order to provide even and uniform coverage of the plants contained therein, a large excess of the liquid may be necessary to ensure saturation of the plants being sprayed.

Similarly, the Hai '658 patent discloses an apparatus for providing a controlled environment for intensive cultivation of vegetable matter. A single water spray inlet is located in the roof of the growing chamber above each of a plurality of cultivation boxes. The disclosed apparatus thus provides a central water spray mechanism disposed over a rectangular cultivation box. However, this centralized water spray mechanism may still fail to provide uniform and even watering of the plants contained within the cultivation fail to provide uniform and even watering of the plants contained within the cultivation box, especially about the corners thereof.

Further, the noted patents both relate to the supply of water to plants which can have different parameters than the supply of agrichemicals to plants. For example, the uniform application of a liquid to the leaves of the plants is more important with agrichemicals than with water, which can be supplied to the soil in which the plants are growing. Accordingly, an even application of water to the leaves of the plants in the Graf, Jr. '974 and Hai '658 patents is not as important as with the agrichemicals according to the present invention.

Thus, there exists a need for an apparatus and a corresponding method for applying an agrichemical, such as a herbicide or a pesticide, to plants in a highly uniform and controllable manner. This apparatus and method should preferably enable the application of agrichemicals as an even surface coating on the plants and should allow the agrichemical application to be accomplished with high consistency between successive batches of plant samples. The apparatus and method should further allow various sizes and shapes of plants to be treated while causing minimal physical impact on the plants. In addition, the apparatus and method should preferably allow any residual noxious fumes or vapors of the agrichemical to be exhausted away from the apparatus in a safe manner. It is further desirable that the apparatus and method be non-reactive with the agrichemical and also capable of being easily cleaned.

SUMMARY OF THE INVENTION

The above and other needs are met by the present invention which, in one embodiment provides a spray booth for reproducible application of agrichemicals to plants comprising a support member for supporting a plurality of plants, a cover having a plurality of sides and a top and forming an enclosure with the support member for enclosing the plants therein, an agrichemical source for providing a pressurized agrichemical, and a spray arm having a spray mechanism operably connected to the agrichemical source. Preferably, the spray arm is disposed within the enclosure and over the support member such that it extends across the width of the support member. The spray mechanism is used for spraying a predetermined amount of the agrichemical therefrom in the form of a fine mist along the length of the spray arm. Advantageously, at least one of the support member and the spray arm is laterally moveable relative to the other such that the plants disposed both lengthwise and widthwise on the support member are substantially uniformly misted with the agrichemical.

A spray booth according to embodiments of the present invention may further include an exhaust hood operably connected to the enclosure for exhausting agrichemical fumes from within the enclosure. Further, at least one of the support member and the spray arm may be moveable in relation to the other to vary the distance therebetween to accommodate plants of various heights on the support member. The support member may also be comprised of a mesh grate or other open porous structure to allow the passage of excess amounts of the agrichemical therethrough. In certain instances, the spray booth may further include a drain pan disposed below the support member to receive excess amounts of the agrichemical therein. In addition, at least a portion of at least one of the sides of the enclosure may be transparent for allowing visual monitoring of the application of the agrichemical to the plants.

The plurality of plants is typically disposed in at least one flat comprising an interconnected array of receptacles. According to one embodiment of the present invention, the spray booth is capable of accommodating up to four flats. According to a preferred embodiment of the present invention, the support member supporting the plants is stationary while the spray arm is adapted to move bidirectionally in a substantially horizontal plane thereabove. In an alternate embodiment, the spray arm is stationary and the support member supporting the plants is adapted to move bidirectionally in a substantially horizontal plane therebelow, wherein the support member may comprise, for example, a conveyor. Thus, the relative movement between the spray arm and the support member provides for substantially uniform misting of the plants with the agrichemical. Further, the pressure and the amount of the agrichemical provided for application to the plants are adjustable to promote the substantially even application of the agrichemical to the plants.

Another advantageous aspect of the present invention comprises a method for reproducibly applying agrichemicals to plants. The first step comprises enclosing a plurality of plants disposed on an underlying support member and a spray arm having a spray mechanism in an enclosure. Preferably, the spray arm is disposed above the support member and adapted to extend thereacross. A predetermined amount of an agrichemical is then sprayed through the spray mechanism such that the agrichemical is misted onto the plants. Simultaneously, at least one of the support member and the spray arm is moved relative to the other in a substantially horizontal plane through at least one cycle to substantially uniformly mist the plants disposed both lengthwise and widthwise on the support member with the agrichemical. Preferably, one cycle comprises misting the plants along the length of the support member in a first direction and then misting the plants along the length of the support member in a second direction which is generally opposite to the first direction.

Thus, it will be appreciated that embodiments of the present invention enable uniform, consistent, and reproducible application of agrichemicals to growing plants of various sizes. The application of the agrichemical in the form of a mist provides for substantially uniform surface coverage while minimizing physical impact on the plants. The movable spray arm and/or support member, in addition to the ability to adjust the spacing therebetween, enhances the uniformity of agrichemical application while allowing the apparatus to accommodate plants of various sizes. Uniform and consistent application of agrichemicals is particularly advantageous in a laboratory setting where highly controlled experimental conditions are necessary to reduce variations and to facilitate interpretation of gathered data. Accordingly, by controlling and automating the amount and the manner in which the agrichemicals are applied to the plants, subsequent batches of plants can be treated with agrichemicals under substantially the same conditions as previous batches. Minimizing variations in the agrichemical application process is especially advantageous, for example, in plant genomics research where it is highly desirable to have uniformly treated plant specimens on which to perform experiments. Highly controlled experimental conditions further provide a method for readily identifying variations in the conditions to which the plant specimens are exposed. An exhaust hood and simple construction with non-reactive materials further permits noxious agrichemicals to be applied while facilitating cleaning upon completion of the agrichemical application process. It will be recognized, therefore, that the invention facilitates the achievement of distinct advantages over prior art plant spraying devices.

BRIEF DESCRIPTION OF THE DRAWINGS

Some of the advantages of the present invention having been stated, others will appear as the description proceeds, when considered in conjunction with the accompanying drawings in which:

FIG. 1A is a frontal elevation of a spray booth according to one embodiment of the present invention.

FIG. 1B is a frontal elevation of a spray booth as shown in FIG. 1A with access doors removed.

FIG. 1C is a cross-sectional view of a spray booth according to one embodiment of the present invention taken along line 1C—1C in FIG. 1B.

DETAILED DESCRIPTION OF THE INVENTION

Figure 2A:
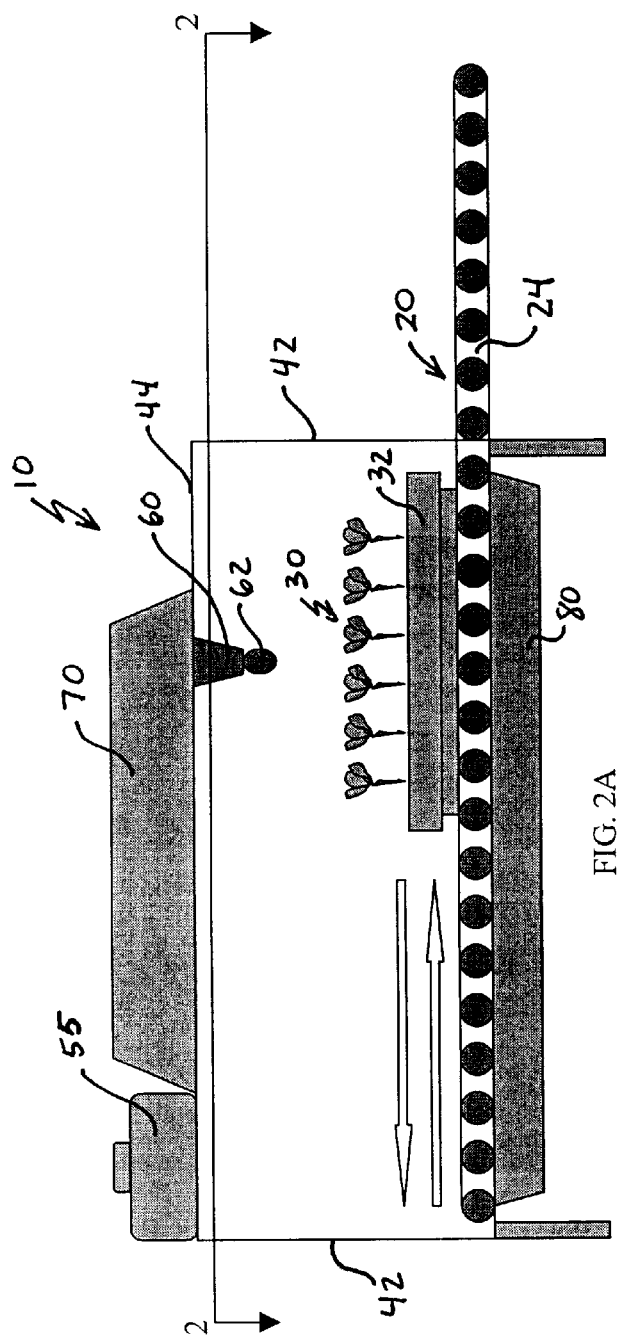
FIG. 2A is a cross-sectional view of a spray booth according to an alternate embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIGS. 1A, 1B, and 1C disclose one embodiment of a spray booth for reproducibly applying agrichemicals to plants, indicated generally by the numeral 10, which includes the features of the present invention. The spray booth 10 generally comprises a support member 20 for supporting a plurality of plants 30 thereon, a cover 40 cooperating with the support member 20 to form an enclosure 50 for enclosing the plants 30 therein, an agrichemical source 55 for providing a pressurized agrichemical, and a spray arm 60 operably connected to the agrichemical source 55 and disposed within the enclosure 50 such that the spray arm 60 extends over and across the support member 20.

The support member 20 generally comprises a substantially horizontal surface for supporting the plurality of plants 30 thereon. The plants 30 typically are simultaneously germinated from seeds disposed in individual receptacles of a standard greenhouse flat 32. Greenhouse flats 32 usually consist of a number of individual receptacles arranged in a grid and attached together such that a number of plants 30 may be contained in a single containing structure. A typical greenhouse flat 32 is, for example, about one foot wide by two feet long and about two inches tall. Further, the heights of the plants 30 to be treated may vary considerably, for example, from about three inches tall to anywhere from 12 inches to 16 inches tall. In advantageous embodiments of the present invention, the support member 20 may accommodate as few as one and as many as four flats 32 thereon.

The cover 40 generally comprises a plurality of sides 42 and a top 44 which cooperate with the support member 20 to form the enclosure 50 for substantially enclosing the plants 30 therein. The enclosure 50 is preferably formed of a material which will not react with the agrichemical being applied to the plants and may be, for example, stainless steel. Inside the enclosure 50, the spray arm 60 is disposed over the support member 20 and extends thereacross. The spray arm 60 further includes a spray mechanism 62 attached thereto and operably connected to the agrichemical source 55. The spray mechanism 62 is adapted to spray a predetermined amount of the agrichemical therefrom in the form of a mist. Preferably, the mist is sprayed substantially uniformly along the length of the spray mechanism 62. The agrichemical may comprise, for example, a herbicide, a pesticide, or a development compound thereof. Such herbicides and pesticides may vary widely in characteristics such as function, toxicity, and the like depending on the particular conditions surrounding the experiment and the condition desired to be treated. However, it is often preferable for the herbicides and pesticides to be applied on or about the surface of the plant, rather than through the root system thereof, to treat specific conditions and/or aspects of the plants. Accordingly, in a particularly advantageous embodiment of the present invention, the spray mechanism 62 is adapted to spray the agrichemical therefrom in the form of a mist and, more specifically, a fine dense mist to provide a substantially uniform surface coating on the plant 30. Therefore, a dousing of the plants 30 is generally not required in order to apply the particular agrichemical. Thus, according to a preferred embodiment of the present invention, it is not typically desirable to apply the agrichemical in a form heavier than a mist, where such heavier forms may be, for instance, a drizzle, a sprinkle, or a shower. The use of a fine mist as the application form of the agrichemical further provides substantially uniform surface coverage of the plants 30 while minimizing the physical impact on the plants 30, thereby minimizing possible variances in gathered experimental data.

In further detail, the agrichemicals are preferably applied as water-soluble formulations and may include a surfactant or detergent to promote even surface coverage on the plant 30. Accordingly, to further promote uniform application of the agrichemical, embodiments of the spray mechanism 62 according to the present invention may further include additional provisions for controlling the delivery of the agrichemical such as, for instance, a provision for adjusting the pressure at which the agrichemical is delivered and the pattern in which it is sprayed from the spray mechanism 62. The spray mechanism 62 may comprise, for example, at least one nozzle (not shown) which may further be adjustable to produce a very fine mist, such as that produced by a common aerosol spray can. Thus, the total amount and pressure of the agrichemical should be adjustable such that the amount of the agrichemical applied to the plants 30 will be the amount required to substantially coat the surface of the plant 30. Preferably, the agrichemical is applied without large excess to minimize physical impact upon the plants and/or to prevent soaking of the soil in which the plants are planted. Further, embodiments of the present invention comprise agrichemicals which are not corrosive, reactive, or flammable, but may have some associated health risks. Therefore, an exhaust system 70 may be provided and operably connected to the enclosure 50 for removing agrichemical vapor or fumes therefrom. Such an exhaust system 70 may be a standard chemical exhaust hood as used in chemical handling operations or the like. In one advantageous embodiment of the present invention, the exhaust system 70 is operably connected to the top of the enclosure 50.

As further shown in FIGS. 1A–1C, the spray booth 10 may further comprise a drain pan 80 disposed below the support member 20 to receive any excess of the applied agrichemical therein. The drain pan 80 may be fitted with one or more hose ports (not shown) to enable flushing and/or draining of the drain pan 80 after agrichemical application and/or during cleaning of the spray booth 10. To facilitate collection of any excess agrichemical, the support member 20 may be comprised of a mesh grating or other open porous structure for allowing the passage of the agrichemical therethrough. While excess application of the agrichemical is normally not desirable, collecting any excess agrichemical dispensed from the spray arm 60 and not deposited on the plants 30 will promote a more accurate determination of the actual amount of the agrichemical applied to the plants 30. In some instances, the support member 20 and the drain pan 80 may also be useful in gathering any debris which may fall from the flats 32 or plants 30 or for collecting cleaning solutions used to clean the interior of the enclosure 50 after use. Still another feature of the present invention comprises an enclosure 50 wherein at least a portion of at least one of the sides 42 of the enclosure 50 is transparent for allowing visual monitoring of the application of the agrichemical to the plants 30 while containing the agrichemical spray within the enclosure 50. As shown in FIG. 1A, the at least one transparent portion may include, for example, transparent panels 54 in access doors 52 on one side 42 of the enclosure 50.

In preferred embodiments of the present invention, at least one of the support member 20 and the spray arm 60 is moveable in relation to the other to vary the distance therebetween. In this manner, the spray booth 10 is able to accommodate plants 30 of various heights on the support member 20, where the plants 30, for instance, may range from about three inches in height up to about 12–16 inches in height when agrichemical application and treatment is required. Thus, the adjustability of the distance between the spray arm 60 and the support member 20 allows the distance therebetween to be adjusted according to the height of the plant 30 and/or the agrichemical application characteristics required for the particular experimental process.

Further, according to preferred and particularly advantageous embodiments of the present invention, at least one of the support member 20 and the spray arm 60 is adapted to move bidirectionally in a substantially horizontal plane with respect to the other. More particularly, the support member 20 may be stationary while the spray arm 60 is adapted to move in a substantially horizontal plane thereabove. Alternatively, the spray arm 60 may be stationary while the support member 20 is adapted to move in a substantially horizontal plane therebelow. Thus, according to a preferred embodiment of the present invention, the spray arm 60 will pass twice over the plants 30 disposed upon the support member 20, once in a first direction and the second time in a second direction, where the second direction is generally opposite to the first direction. Two passes of the spray arm 60 over the plants 30 promotes substantially uniform application of the agrichemical to the plants 30. That is, plants 30 often grow with the leaves angled in different directions about the stem. Therefore, one pass of the spray arm 60 over the plants 30 may not be sufficient to provide a uniform application of the agrichemical to the plants 30, especially where the leaves may not be inclined at a favorable angle to receive the agrichemical mist. Thus, the second pass of the spray arm 60 going back in the opposite direction of the first direction will produce a more even and uniform application of the agrichemical by allowing the unfavorably inclined leaves to be misted from a second and possibly more favorable direction. Accordingly, in one embodiment of the present invention, the support member 20 is stationary and capable of supporting, for example, four flats 32 thereon, while the spray arm 60 is then adapted to move substantially horizontally above the support member 20. Thus, once the agrichemical is being sprayed from the spray mechanism 62 in the form of a fine mist, the spray arm 60 is moved lengthwise over the support member 20 from a starting point SP to a reversal point RP, covering all four flats 32 with the agrichemical mist, before returning in the opposite direction to the starting point SP. In order to assure substantially uniform application of the agrichemical to the plants 30, the support member 20 may include open areas 22 about either end thereof to prevent excess application of the agrichemical about the starting point SP of the spray arm 60 and the reversal point RP.

Figure 2B:
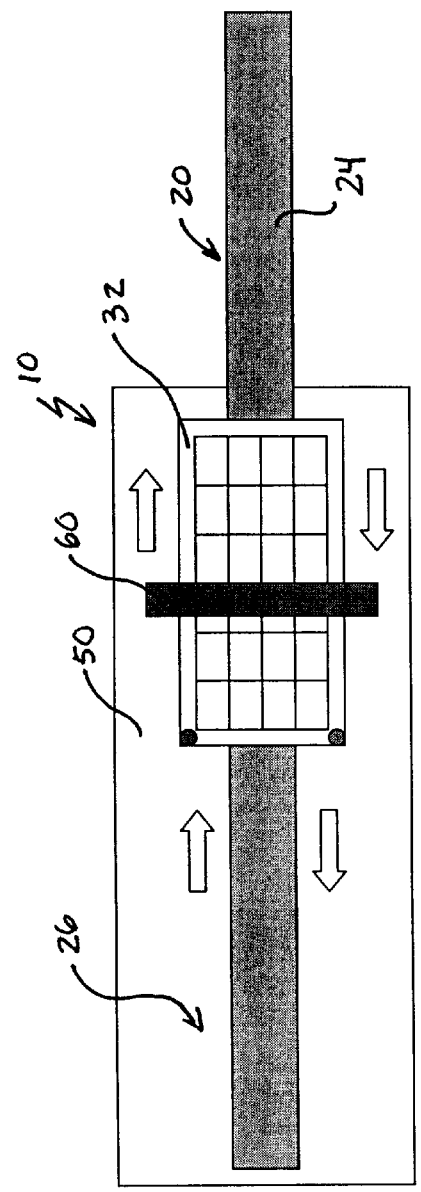
FIG. 2B is a cross-sectional view of a spray booth according to an alternate embodiment of the present invention taken along line 2—2 in FIG. 2A.

As shown in FIGS. 2A and 2B, and according to an alternate embodiment of the present invention, the spray arm 60 may be stationary while the support member 20 is capable of moving in a substantially horizontal plane therebelow. The support member 20 may comprise, for example, a conveyor 24 for supporting the flat 32 thereon. Accordingly, the spray booth 10 may be configured such that the conveyor 24 transports one or more flats 32 into the enclosure 50 and under the stationary spray arm 60. The conveyor 24 moves the flat(s) 32 underneath the spray arm 60 until all of the flat(s) 32 have been sprayed in one direction. The conveyor 24 is then reversed such that bidirectional application of the agrichemical is obtained and the flat(s) 32 returned to the staging area at which they were placed on the conveyor 24. At the points where the conveyor 24 enters the enclosure 50, appropriate mechanisms may be provided for the plants 30 to enter and exit the enclosure 50 without causing physical impact or damage thereto, while retaining the majority of the agrichemical within the enclosure 50. In addition, the conveyor 24 may also include open areas 22 about the spray arm 60 to allow the flats 32 to clear the area beneath the spray arm 60 in either direction of the conveyor 24 to prevent non-uniform application of the agrichemical to the plants 30.

Figure 2C:
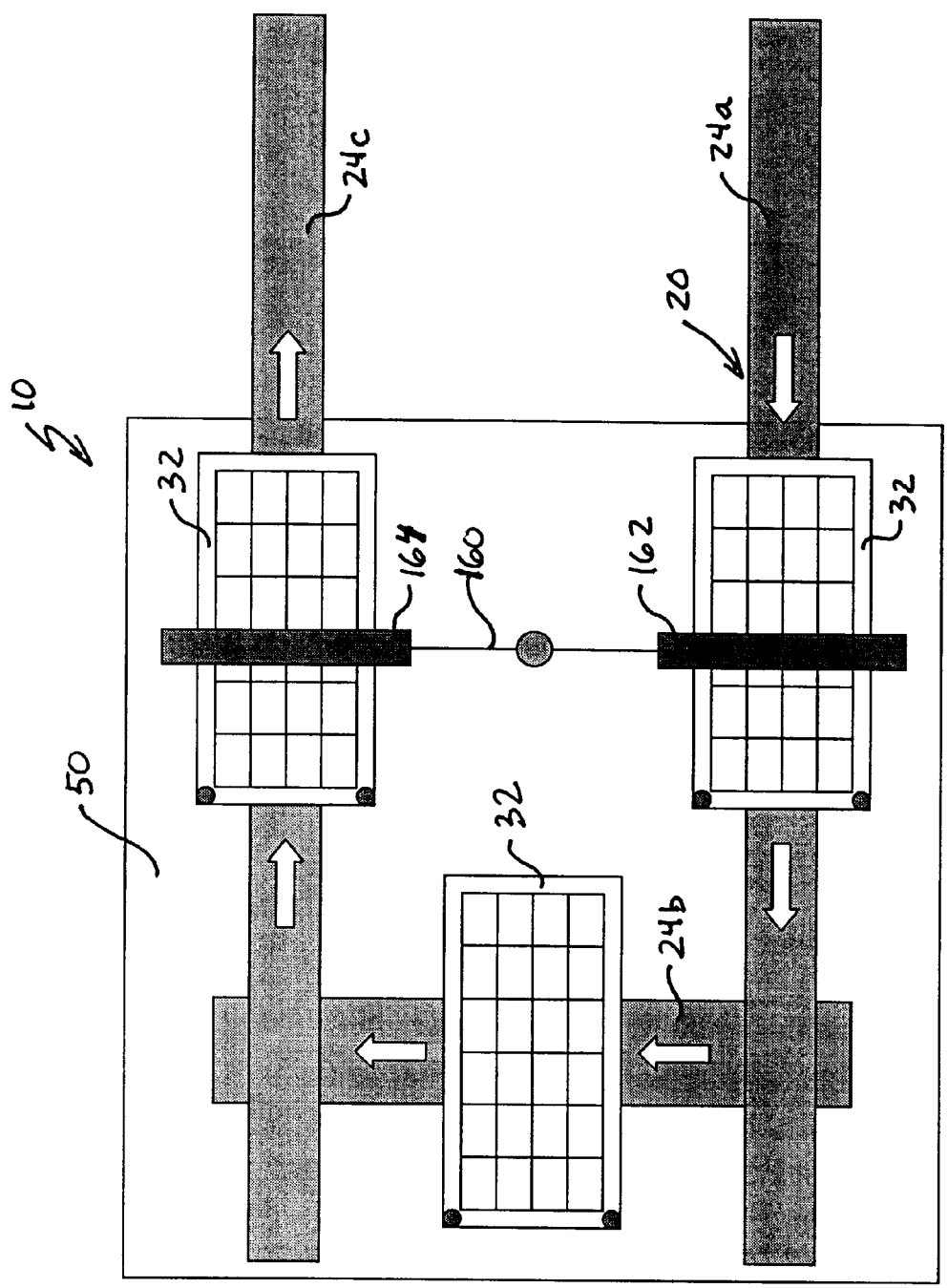
FIG. 2C is a cross-sectional view of a spray booth according to another alternate embodiment of the present invention taken along line 2—2 in FIG. 2A.

As shown in FIG. 2C and according to yet another alternate embodiment of the present invention, the support member 20 may comprise three conveyors 24a, 24b, and 24c with a stationary spray arm 160 disposed thereabove. In this embodiment, a first conveyor 24a transports the flats 32 into the enclosure 50 and under a first spray mechanism 162 operably connected to one end of the spray arm 160. The first conveyor 24a transports the flats 32 into the enclosure 50 until the flats 32 are clear of the mist emitted by the spray mechanism 162. A second conveyor 24b then transports the flats 32 laterally to a third conveyor 24c. The third conveyor then transports the flats 32 under a second spray mechanism 164 operably connected to the spray arm 160 on the end of the spray arm 160 opposite the first spray mechanism 162. Thus, the flats 32 are transported under the second spray mechanism 164 in the same orientation in which they passed under the first spray mechanism 162, but in the opposite direction. Thus, bidirectional application of the agrichemical to the plants 30 is obtained before the flats 32 exit the enclosure 50 and a substantially continuous operation is facilitated. The substantially continuous operation may further facilitate variable and/or increased throughput rates for agrichemical treatment of the plants 30.

Figure 3:
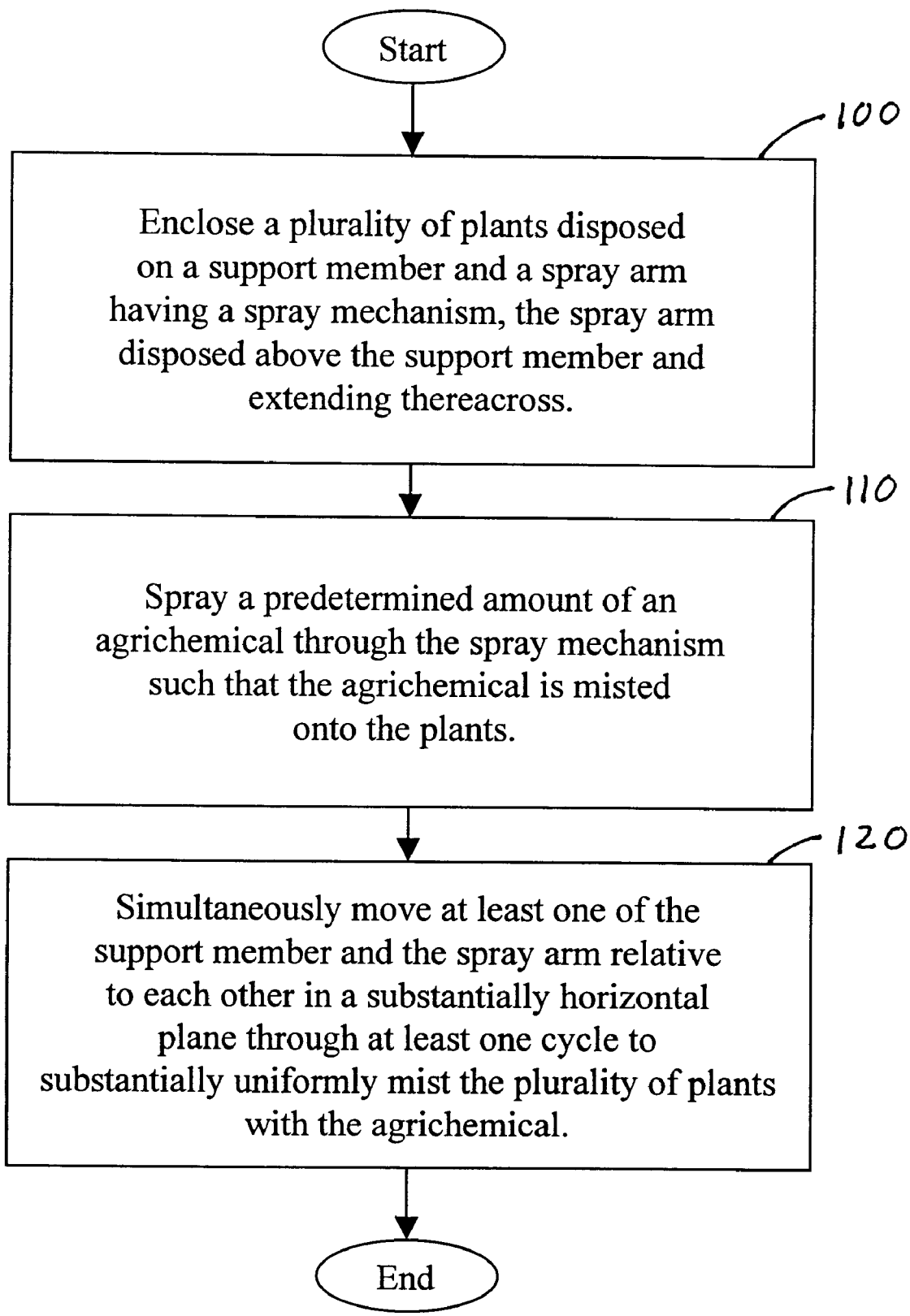
FIG. 3 is a flow diagram of a method according to one embodiment of the present invention.

Another advantageous aspect of the present invention comprises a method for reproducibly applying agrichemicals to plants as shown in FIG. 3. First, a plurality of plants 30 disposed on an underlying support member 20 and a spray arm 60 having a spray mechanism 62, wherein the spray arm 60 is disposed above the support member 20 and is adapted to extend thereacross, are enclosed in an enclosure 50 (block 100). A predetermined amount of an agrichemical is then sprayed through the spray mechanism 62 such that the agrichemical is misted onto the plants 30 therebelow (block 110). Simultaneously with the step of spraying the agrichemical, at least one of the support member 20 and the spray arm 60 are moved relative to the other in a substantially horizontal plane through at least one cycle to substantially uniformly mist the plants 30, disposed both lengthwise and widthwise on the support member 20, with the agrichemical (block 120). One cycle comprises misting the plurality of plants 30 along the length of the support member 20 in a first direction and then misting the plurality of plants 30 along the length of the support member 20 in a second direction, wherein the second direction is generally opposite to the first direction.

Further, a method according to one embodiment of the present invention may comprise the step of adjusting the distance between the spray arm 60 and the support member 20 to vary the distance therebetween in order to accommodate plants 30 of various heights, generally before the enclosing step. In addition, the moving step may further comprise moving at least one of the support member 20 and the spray arm 60 with respect to the other in a substantially horizontal plane. Where the support member 20 is moveable, the support member 20 may comprise a conveyor 24 such that the moving step further comprises operating the conveyor 24 to transport the plants 30 disposed thereon beneath the spray arm 60 to spray the plants 30 with the agrichemical. Following the dispensing and moving steps, the enclosure 50 may be exhausted with an exhaust hood 70 operably connected thereto.

Thus, it will be appreciated that embodiments of the present invention enable uniform, consistent, and reproducible application of agrichemicals to growing plants of various sizes. The application of the agrichemical in the form of a mist provides for substantially uniform surface coverage while minimizing physical impact on the plants. The movable spray arm and/or support member, in addition to the ability to adjust the spacing therebetween, enhances the uniformity of agrichemical application while allowing the apparatus to accommodate plants of various sizes. Uniform and consistent application of agrichemicals is particularly advantageous in a laboratory setting where highly controlled experimental conditions are necessary to reduce variations and to facilitate interpretation of gathered data. Accordingly, by controlling and automating the amount and the manner in which the agrichemicals are applied to the plants, subsequent batches of plants can be treated with agrichemicals under substantially the same conditions as previous batches. Minimizing variations in the agrichemical application process is especially advantageous, for example, in plant genomics research where it is highly desirable to have uniformly treated plant specimens on which to perform experiments. Highly controlled experimental conditions further provide a method for readily identifying variations in the conditions to which the plant specimens are exposed. An exhaust hood and simple construction with non-reactive materials further permits noxious agrichemicals to be applied while facilitating cleaning upon completion of the agrichemical application process. Therefore, the spray booth according to the present invention minimizes the variances in the treatment of the plants during the agrichemical spraying process and provides a more uniform plant sample selection, which is especially advantageous in the area of plant genomics research.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A spray booth for reproducible application of agrichemicals to plants, said spray booth comprising:
    a support member for supporting a plurality of plants thereon;
    a cover having a plurality of sides and a top, the cover and the support member forming an enclosure for enclosing the plurality of plants therein;
    an agrichemical source for providing a pressurized agrichemical; and
    a spray arm having a spray mechanism operably connected to the agrichemical source, the spray arm disposed within the enclosure and over the support member such that the spray arm extends across the support member, the spray mechanism for spraying a predetermined amount of the agrichemical therefrom in the form of a mist along the length of the spray arm, wherein at least one of the support member and the spray arm is laterally movable in a substantially horizontal plane relative to the other such that the plants disposed on the support member are substantially uniformly misted with the agrichemical.

2. A spray booth according to claim 1 further including an exhaust hood operably connected to the enclosure for exhausting agrichemical fumes from within the enclosure.

3. A spray booth according to claim 2 wherein the exhaust hood is operably connected to the top of the enclosure.

4. A spray booth according to claim 1 wherein at least one of the support member and the spray arm is movable in relation to the other to vary the distance therebetween to accommodate plants of various heights on the support member.

5. A spray booth according to claim 1 wherein the support member is stationary and the spray arm is adapted to move bidirectionally in a substantially horizontal plane thereabove.

6. A spray booth according to claim 1 wherein the spray arm is stationary and the support member is adapted to move bidirectionally in a substantially horizontal plane therebelow.

7. A spray booth according to claim 6 wherein the support member comprises a conveyor.

8. A spray booth according to claim 1 wherein the support member is comprised of an open structure to allow the passage of excess amounts of the agrichemical therethrough.

9. A spray booth according to claim 8 further including a drain pan disposed below the support member to receive the excess amounts of the agrichemical therein.

10. A spray booth according to claim 1 wherein at least a portion of at least one of the sides of the enclosure is transparent for allowing visual monitoring of the application of the agrichemical to the plants.

11. A spray booth according to claim 1 wherein the plurality of plants are disposed in at least one flat comprising an interconnected array of receptacles and the spray booth is capable of accommodating up to four flats.

12. A spray booth according to claim 1 wherein the pressure and the amount of the agrichemical provided for application to the plurality of plants are adjustable such that the plurality of plants are substantially evenly misted.

13. A method for reproducibly applying agrichemicals to plants, said method comprising the steps of:
    enclosing a plurality of plants disposed on an underlying support member and a spray arm having a spray mechanism, the spray arm disposed above the support member and extending thereacross;
    spraying a predetermined amount of an agrichemical through the spray mechanism such that the agrichemical is misted onto the plants; and
    simultaneously moving at least one of the support member and the spray arm relative to the other in a substantially horizontal plane through at least one cycle to substantially uniformly mist the plants disposed on the support member with the agrichemical, the at least one cycle comprising misting the plants along the length of the support member in a first direction and then misting the plurality of plants along the length of the support member in a second direction generally opposite to the first direction.

14. A method according to claim 13 further comprising the step of adjusting the distance between the spray arm and the support member to vary the distance therebetween to accommodate plants of various heights before the enclosing step.

15. A method according to claim 13 wherein the moving step further comprises maintaining the support member in a stationary position and moving the spray arm in a substantially horizontal plane thereabove.

16. A method according to claim 13 wherein the moving step further comprises maintaining the spray arm in a stationary position and moving the support member in a substantially horizontal plane therebelow.

17. A method according to claim 16 wherein the support member comprises a conveyor and the moving step further comprises operating the conveyor such that the plurality of plants disposed thereon are transported underneath the spray arm to be sprayed with the agrichemical.

18. A method according to claim 13 further comprising the step of exhausting the enclosure with an exhaust hood operably connected thereto following the dispensing and moving steps.

* * * * *